(12) United States Patent
Lindauer

(10) Patent No.: US 9,546,049 B2
(45) Date of Patent: Jan. 17, 2017

(54) METHOD AND SYSTEM FOR DISCHARGING BEVERAGE CONTAINERS CONTINUOUSLY MOVED ON A HORIZONTAL CONVEYOR AND GUIDED IN PARALLEL ROWS

(71) Applicant: Krones AG, Neutraubling (DE)

(72) Inventor: Matthias Lindauer, Rott am Inn (DE)

(73) Assignee: Krones AG, Neutraubling (DE)

( * ) Notice: Subject to any disclaimer, the term of this patent is extended or adjusted under 35 U.S.C. 154(b) by 121 days.

(21) Appl. No.: 14/504,825

(22) Filed: Oct. 2, 2014

(65) Prior Publication Data

US 2015/0098782 A1 Apr. 9, 2015

(30) Foreign Application Priority Data

Oct. 7, 2013 (DE) ......................... 10 2013 111 088

(51) Int. Cl.
*B65G 47/86* (2006.01)
*B65G 47/90* (2006.01)
*B65B 21/18* (2006.01)

(52) U.S. Cl.
CPC ............. *B65G 47/907* (2013.01); *B65B 21/18* (2013.01)

(58) Field of Classification Search
CPC .................................................... B65G 47/86
(Continued)

(56) References Cited

U.S. PATENT DOCUMENTS 4,024,745 A * 5/1977 Karlberger ............ B21C 47/143
140/2
5,243,690 A * 9/1993 Chmielewski, Jr. ... B25J 9/1697
700/259

(Continued)

FOREIGN PATENT DOCUMENTS

CN 88109306 C 9/1992
CN 1098695 A 2/1995
(Continued)

OTHER PUBLICATIONS

European Search Report for EP 14 18 7488 dated Feb. 19, 2015.
(Continued)

*Primary Examiner* — Timothy Waggoner
*Assistant Examiner* — Lester Rushin
(74) *Attorney, Agent, or Firm* — Dennemeyer & Associates, LLC

(57) ABSTRACT

A method and system (1) for discharging beverage containers (6) continuously moved on a horizontal conveyor (10) and guided in parallel rows by one or more gripping heads (3a, 3b, 3c) are disclosed. The one or more gripping heads (3a, 3b, 3c) respectively form at least one pick-up position for the beverage containers (6) to be discharged. The beverage containers (6) are guided on the horizontal conveyor (10) at least approximately together. In the scope of the method, an actual position (IP), adopted in the conveying direction (FR), of one or more of the continuously moved beverage containers (6) is acquired. Moreover, a travelling movement, oriented in parallel to the conveying direction (FR) of the beverage containers (6), of the one or more gripping heads (3a, 3b, 3c) is adapted while taking into account the acquired actual position (IP). Also, a lowering motion of the one or more gripping heads (3a, 3b, 3c) for accepting respectively one beverage container (6) by respectively one of the at least one pick-up positions (A, B, C, D)

(Continued)

thereof is performed. In addition, removal of the beverage containers (6) from the horizontal conveyor (10) is performed by means of a lifting motion of the respective one or more gripping heads (3a, 3b, 3c).

16 Claims, 4 Drawing Sheets

(58) Field of Classification Search
USPC .......... 198/470.1, 571, 341.01, 345.01, 456, 198/468.6, 429, 431, 432, 433
See application file for complete search history.

(56) References Cited

U.S. PATENT DOCUMENTS

| | | |
|---|---|---|
| 5,375,395 A | 12/1994 | Gmeiner |
| 8,286,409 B2 * | 10/2012 | Junghans ............. B65G 47/918 53/247 |

FOREIGN PATENT DOCUMENTS

| | | | |
|---|---|---|---|
| CN | 1503751 | A | 6/2004 |
| CN | 101327851 | A | 12/2008 |
| CN | 201647143 | U | 11/2010 |
| CN | 102358448 | A | 2/2012 |
| CN | 202464630 | U * | 10/2012 |
| DE | 12 06 783 | B | 12/1965 |
| DE | 1 922 739 | A1 | 11/1970 |
| DE | 27 11 702 | A1 | 9/1978 |
| DE | 42 04 993 | C1 | 2/1993 |
| DE | 201 08 401 | U1 | 9/2002 |
| DE | 201 20 700 | U1 | 6/2003 |
| EP | 0 613 841 | A1 | 9/1994 |
| EP | 0613841 | A1 | 9/1994 |
| EP | 1 260 469 | A1 | 11/2002 |
| EP | 2 537 644 | A1 | 12/2012 |
| WO | 95/08476 | A1 | 3/1995 |
| WO | 2012/101589 | A1 | 8/2012 |

OTHER PUBLICATIONS

German Search Report for DE 10 2013 111 088.6 dated Jul. 16, 2014.

Chinese office action dated Feb. 19, 2016 for application No. CN 2014105261559.

* cited by examiner

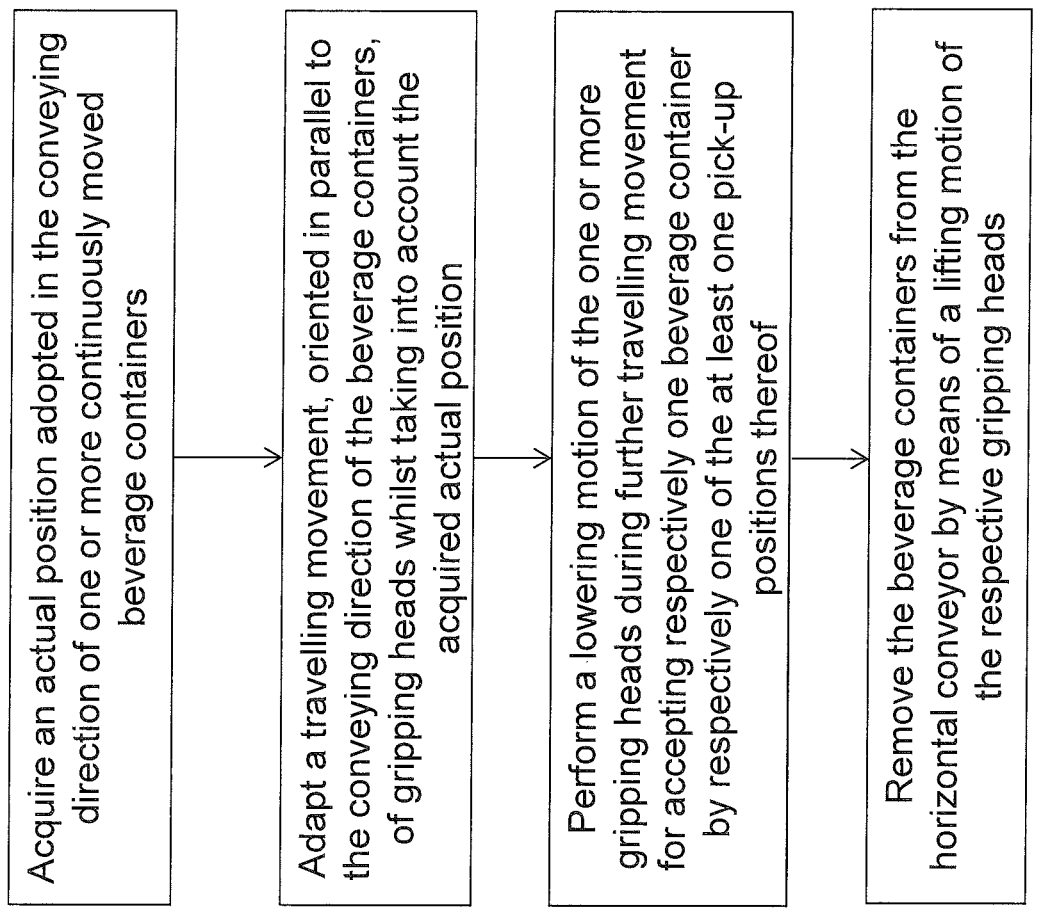

METHOD AND SYSTEM FOR DISCHARGING BEVERAGE CONTAINERS CONTINUOUSLY MOVED ON A HORIZONTAL CONVEYOR AND GUIDED IN PARALLEL ROWS

FIELD OF THE INVENTION

This invention relates to a method as well as a system for discharging beverage containers continuously moved on a horizontal conveyor and guided in parallel rows.

BACKGROUND OF THE INVENTION

In a plurality of conceivable stations in the field of beverage technology, there is a need for beverage containers to be discharged from a horizontal conveyor and subsequently guided on or delivered to downstream stations. In this respect, in particular in the field of packing technology, installations are known from prior art in which the respective beverage containers are accepted from a horizontal conveyor and then placed into packaging units, such as cardboard boxes, beverage crates, or the like.

In general, prior to being accepted from the horizontal conveyor, the respective beverage containers or bottles are already ordered and standing against each other. For this purpose, the beverage containers can be passed on to the horizontal conveyor via an appropriate inlet, and after having entered the horizontal conveyor, guided in several channels oriented in parallel to each other. If the beverage containers are accepted from the horizontal conveyor, then the respective positions are known. For this reason, possibly existing gripping devices can be lowered over the beverage containers at defined positions, accept the beverage containers, and then drop them into the corresponding packaging units.

Such a device is disclosed for example in the German patent no. 42 04 993. The German patent shows a device for supplying containers to a continuously operating packaging machine. The device comprises a plurality of gripping heads which are hinged at one lever, respectively, while being rotationally driven. In addition, a conveyor belt is disclosed guiding bottles in the direction of the respective gripping heads. Herein the bottles are arranged in rows, stopped at one end of the conveyor belt by a stop, and accepted by one of the gripping heads. Once they have been accepted, the stop is lowered. Further bottles move up, the bottles already accepted being placed into corresponding crates by the gripper head and subsequently removed. Further bottles having moved up in the meantime can be accepted by another gripping head and dropped into another following crate.

In such devices known from prior art, it has been demonstrated that the expected nominal position when accepting the respective containers from the conveyor belt does not always match the real actual position. In particular, this can be the case when the respective containers are embodied, for example, by PET bottles, which tend to be dimensionally unstable. Also, inaccuracies may occur when the respective beverage containers are transferred onto the horizontal conveyor, so that the real actual position is known only approximately.

If deviations from the expected nominal position occur, the respective gripping devices for accepting the respective containers may collide with the containers, with the containers not being accepted by the devices. This may lead to damage to the respective gripping device. Moreover, in order to correct this defect, an interruption of the process may be required, leading to delays in container production and lower throughput.

Therefore, the object of the invention is to provide a method and system by means of which beverage containers guided in parallel rows can be accepted and discharged from a horizontal conveyor with increased precision. In addition, implementation of the method must be easy and simple, and system structure must be simple.

SUMMARY OF THE INVENTION

The above-mentioned objects are achieved by a method and system including the features of patent claim 1 or patent claim 10. Further advantageous configurations are described in the sub-claims.

The inventive method is provided for discharging beverage containers continuously moved on a horizontal conveyor and guided in parallel rows. The beverage containers can be formed by bottles, such as glass bottles, PET bottles, or the like, for example. In particular, the inventive method can be used for beverage containers formed by PET bottles, as the latter have lower dimensional stability with respect to glass bottles. As in the inventive method, the beverage containers are moved on the horizontal conveyor while being at least approximately closed, one or more of the beverage containers may stand next to each other under pressure, which may result in deformation of one or more of the beverage containers. Together with the deformation, the respective actual position of the beverage containers in the conveying direction may deviate from an expected nominal position so that an adaptation, to be described in further detail below, of the travel movement of one or more gripping heads for accepting the beverage containers may be required.

For a person skilled in the art it is obvious that the inventive method can be put to use in various embodiments for other beverage containers so that the inventive method or inventive system is not limited to discharging beverage containers formed by PET bottles and/or glass bottles.

Moreover, the beverage containers may already be filled when they are discharged from the horizontal conveyor. However, it can also be envisaged for the respective beverage containers to be moved in an unfilled state by means of the horizontal conveyor, and then to be discharged in the still unfilled state.

E.g., provision can be made for one or more channel plates to be arranged along the horizontal conveyor in parallel to the conveying direction of the respective beverage containers. With several channel plates, the respective channel plates may be oriented in parallel to each other and guide the respective beverage containers in parallel rows. Thus, the beverage containers can be guided on the horizontal conveyor in an ordered mass flow.

Preferably, the channel plates extend over the entire longitudinal extension of the horizontal conveyor. Furthermore, for guiding the beverage containers in parallel rows, side walls may be arranged on either side of the horizontal conveyor, possibly extending in parallel to the respective channel plate or plates. In preferred embodiments, the horizontal conveyor is formed by a rotating endless conveyor belt.

As the beverage containers are accepted by one or more gripping heads, when the beverage containers are formed by bottles, the channel plates or the side walls preferably do not extend in a vertical direction beyond the bottle neck, so that the respective beverage containers can be held while being accessible from above for the one or more gripping heads.

E.g., prior to being transferred to the horizontal conveyor, the beverage containers may be moved in an unordered mass flow. In addition, upstream from the horizontal conveyor, a device may be placed splitting up the respective beverage containers for the rows guided in parallel. The device may comprise one or more adjustable switches. A person skilled in the art will know how to configure such devices, so that within the scope of the present patent application it is not necessary to deal more in detail with splitting options.

In a travelling movement to be described more in detail hereafter and when accepting the respective beverage containers from the horizontal conveyor, the one or more gripping heads can be guided above the beverage containers.

E.g., it can be envisaged for a single gripping head to be provided for the implementation of the inventive method. However, in preferred embodiments, there may be more than one gripping head, e.g. two or three gripping heads, arranged one after the other in the conveying direction of the beverage containers and possibly moving in speed synchronism before or after adaptation of the travelling movement thereof. Herein, the several gripping heads can be flush to each other in the conveying direction of the beverage containers while they are being moved. Accepting and/or discharging of the beverage containers can take place with all gripping heads at the same time. Moreover, it can be envisaged for one or more of the gripping heads to be arranged adjacent to each other in the conveying direction of the beverage containers and move together in parallel to the conveying direction of the beverage containers.

It is also possible for a linear guide to extend above the horizontal conveying direction and at least locally along the horizontal conveyor, with which the one or more gripping heads are connected. Herein, the one or more gripping heads can move along the linear guide for discharging and accepting beverage containers. In addition, if a packaging machine is provided to which the beverage containers are to be transferred after having been discharged, then the linear guide may extend at least locally into the area of the packaging machine.

E.g., there may be a packaging machine guiding several packaging units above a horizontal conveyor. The packaging units can be formed by cardboard boxes, beverage crates, or the like, for example, with the one or more gripping heads dropping the beverage containers into the respective packaging units when they are accepted. The horizontal conveyor of the packaging machine can also be formed by an endless conveyor belt.

According to the invention, the one or more gripping heads respectively form at least one pick-up position for the beverage containers to be discharged. E.g., the pick-up positions can be formed by gripping devices, such as tulip-shaped grippers, one or more gripping fingers, or the like. In one embodiment of the present invention, provision can be made for several gripping heads to be available, wherein the several gripping heads respectively form exactly one pick-up position or one gripping device for the respective beverage containers. In the respective pick-up positions, after having been accepted, the respective beverage containers can be held above the respective gripping devices in the pick-up positions by vacuum, clamping, and/or positive engagement.

In addition, provision is made for the beverage containers to be guided on the horizontal conveyor in an at least approximately closed state. Consequently, the beverage containers are guided on the horizontal conveyor so that there is no or substantially no gap between consecutive beverage containers. Thus, in the travelling movement on the horizontal conveyor, the beverage containers can stand against each other, or directly consecutive beverage containers of the respective row can be brought into surface contact with each other.

According to the invention, in the scope of the method, an actual position occupied in the conveying direction of one or more of the continuously moved beverage containers is acquired in a first step. E.g., it can be envisaged that when occupying a nominal position, beverage containers of a first row are flush with beverage containers of the other rows during the continuous conveying travelling movement thereof, continuously vertically to the conveying direction. In addition, by means of acquiring the actual position, it may be possible for a deviation of the flush alignment of beverage containers of a first row with respect to beverage containers of one or more other ones of the parallel rows to be detected. If a deviation of the flush alignment is detected when the actual position is acquired, adaptation of a travelling movement of the one or more gripping heads can take place. E.g., optical acquisition systems, such as cameras or the like, are appropriate for acquiring the actual position. In preferred embodiments, as described more in detail hereafter, one or more photoelectric sensors can be used.

Within the scope of another method step, adaptation of a travelling movement, oriented in parallel to the conveying direction of the beverage containers, of the one or more gripping heads is performed whilst taking into account the acquired actual position. E.g., provision can be made for the one or more gripping heads, immediately before the adaptation of the travelling movement thereof, to be moved identically to the conveying or transport speed of the horizontal conveyor and/or identically to the speed of a stop to be described more in detail hereafter. In addition, in preferred embodiments, the one or more gripping heads can be moved immediately before adaptation of the travelling movement thereof in parallel to the conveying direction of the beverage containers.

If an actual position is detected where beverage containers of a first row are not flush with beverage containers of one or more other rows and/or where an actual position of one or more beverage containers deviate from an expected nominal position, then deceleration or acceleration of the one or more gripping heads with respect to the conveying speed of the horizontal conveyor or the speed of the stop may occur. Deceleration or acceleration can be formed such that as a result from deceleration or acceleration, relative alignment of the pick-up positions of the respective one or more gripping heads occurs with respect to the beverage containers continuously moved on the horizontal conveyor.

In particular, embodiments have proven successful in which adaptation of a travelling movement of the one or more gripping heads is performed at least approximately in real time whilst taking into account the detected actual position.

Thus, even though their real actual position in the conveying direction deviates from an expected nominal position, the beverage containers can have their pick-up positions aligned with the beverage containers by brief acceleration or brief deceleration or adaptation of the respective travelling movement thereof. The risk of the respective beverage containers tipping over when once adapted they are accepted by the respective gripping head, as well as a beverage container being missed by the gripping head when it is accepted due to deviation of the actual position from the expected nominal position can thus be reduced or precluded.

It is also possible for the actual position of the beverage containers to deviate from an expected nominal position, with the beverage containers of the parallel rows however being completely flush or at least partially flush with each other, vertically to the conveying direction of the beverage containers. In this case, too, after the respective actual position of the beverage containers has been detected and deviates from an expected nominal position, a travelling movement of the one or more gripping devices can be adapted, wherein the pick-up positions of the one or more gripping devices are aligned on the beverage containers in view of accepting the respective beverage containers. If required, adaptation of the travelling movement of the one or more gripping devices can be performed by a control unit which will be discussed more in detail hereafter.

Once the travelling movement of the one or more gripping heads has possibly been adapted to the acquired actual position of one or more beverage containers, in a following method step, a lowering motion of the one or more gripping heads is performed during the further travelling movement thereof for accepting respectively one beverage container by respectively one of the at least one pick-up positions thereof.

Thus, the travelling movement of the one or more gripping heads in the conveying direction can preferably be continued during a lowering motion. Preferably, during the lowering motion with the beverage containers, the one or more gripping heads are moved continuously in parallel to the conveying direction of the beverage containers.

As already mentioned before, with the at least one pick-up position of the one or more gripping heads, respectively at least one gripping device, such as for instance a tulip-shaped gripper or the like, can be associated, by means of which the respective beverage container can be secured to the respective gripping head, e.g., via vacuum, clamping, and/or positive engagement. If a lowering motion of the one or more gripping heads was performed, then the respective beverage containers can be accepted by the gripping device associated with the respective pick-up position so that the or the respective beverage container(s) is/are temporarily and solidly connected to the respective gripping head. The temporary connection can be maintained during the following lifting motion of the one or more gripping heads in order to discharge the respective beverage containers from the horizontal conveyor. If the respective beverage containers are then transferred to other stations, such as a packaging machine for example, the temporary connection between the one or more gripping heads and the or the respective beverage container(s) can be disconnected after the transfer.

In preferred embodiments, if more than one gripping head is available, provision can thus be made for the beverage containers to be accepted at least approximately in time synchronism by all of the gripping heads.

Consequently, all of the gripping heads can perform the lowering motion thereof for accepting the respective beverage containers at least approximately in time synchronism. In particular, embodiments have proven successful in which the pick-up positions of a first one of the one or more gripping heads are continuously flush with pick-up positions of a second one of the one or more gripping heads during the travelling movement thereof and during the lowering motion thereof in the conveying direction of the beverage containers.

In addition, provision is made for removal of the beverage containers from the horizontal conveyor to be performed by means of a lifting motion of the respective one or more gripping heads. Preferably during removal of the beverage containers or during the lifting motion, the one or more gripping heads can continue to be moved in parallel to the conveying direction of the beverage containers. Consequently, the travelling movement of the one or more gripping heads during removal of the beverage containers from the horizontal conveyor can still continue in parallel to the conveying direction of the beverage containers.

Once the lifting motion has been performed by the respective one or more gripping heads, it can be envisaged for the respective beverage containers to be dropped directly into packaging units of a packaging machine. For this purpose, in various embodiments, the one or more gripping heads can still be moved in parallel to the conveying direction of the beverage containers until the respective beverage containers are dropped, and continue the travelling movement thereof preferably without any interruption. Once the respective beverage containers have been accepted, it is also conceivable for the respective one or more gripping heads to be deflected and moved towards the packaging units. The respective packaging units can be moved during the dropping operation while standing on a horizontal conveyor. Also, it is conceivable for the packaging units to stand on a horizontal conveyor which is driven intermittently so that the packaging units will stand still while the beverage containers are being dropped. A person skilled in the art will understand how to possibly implement such dropping of beverage containers into packaging units, so that in the present invention further discussion thereof will be omitted.

In a conceivable embodiment, the gripping heads as such can be formed by gripping devices, such as tulip-shaped grippers or the like, for example, thereby forming respectively exactly one pick-up position for beverage containers. However, in preferred embodiments of the present invention, for each row of the continuously guided beverage containers, the gripping heads respectively have at least one, preferably however more than one pick-up position. If the one or more gripping heads respectively have more than one pick-up position for each row, then the method can be performed with increased throughput.

E.g., it is possible for the number of pick-up positions of each of the at least one gripping heads to correspond to the number of beverage containers provided for one packaging unit. In particular, embodiments have proven successful in which the number of pick-up positions of each of the at least one gripping heads exactly corresponds to the number of beverage containers provided for one packaging unit.

Thus, by accepting beverage containers from the horizontal conveyor and subsequently dropping them into the packaging units, a packaging unit can be completely filled with beverage containers by a gripping head. As already mentioned above, there may be several gripping heads moving synchronously. By accepting and dropping the beverage containers via the several synchronously moved gripping heads it is thus possible to completely fit several packaging units with beverage containers at least approximately in time synchronism, thereby allowing for throughput of the method to be further increased.

If more than one pick-up position for each row of the continuously guided beverage containers is provided, then it is possible for the pick-up positions of each row to be adjustable relatively to each other and depending on the acquired actual position. However, in further embodiments, provision is made for the pick-up positions at the one or more gripping heads to be specified as fixed or at least approximately fixed. E.g., for this purpose, gripping devices, such as tulip-shaped grippers or the like, can be provided which are held in specified positions at the respective gripping head. If a relative adjustment of the pick-up positions is provided, then the gripping devices, such as tulip-shaped grippers or the like, can be arranged at the respective gripping head so as to be movable with respect to each other.

Also in embodiments where the pick-up positions are specified as at least approximately fixed, respectively one gripping device can form respectively one pick-up position, with the gripping devices, such as tulip-shaped grippers or the like, being held in an articulated manner at the respective gripping head and thus allow for some tolerance of the respective actual position of beverage containers when they are accepted.

During the further travelling movement and removal by means of the lifting motion, it is also possible for the one or more gripping heads to be moved continuously in speed synchronism with the beverage containers and in parallel to the conveying direction thereof. As due to a previous adjustment of the travelling movement of the one or more gripping heads the respectively at least one pick-up position has been aligned in relation to the beverage containers, the relative alignment can be maintained by a continuously speed-synchronous movement of the one or more gripping heads during the further travelling movement and during removal.

Preferably, the beverage containers are moved at constant speed by means of the horizontal conveyor so that the speed-synchronous movement of the one or more gripping heads can also be made to be continuously constant during the further travelling movement and when the beverage containers are accepted.

In addition, it is possible that the continuous movement of the beverage containers is decelerated by at least one mobile stop oriented transversely to the conveying direction, and speed of the stop is taken into account when the travelling movement of the one or more gripping heads is adapted. Preferably, the at least one mobile stop can be oriented vertically to the conveying direction of the beverage containers. In particular, the mobile stop can be brought into surface contact with respectively one leading beverage container of respectively one of the parallel rows.

As in this embodiment, the continuous movement of the beverage containers is to be decelerated by the stop, while moving the mobile stop may have a speed which is made to be reduced with respect to the transport speed of the horizontal conveyor. Deceleration makes sense because this allows for the respective beverage containers transported by means of the horizontal conveyor to be brought into abutment against each other so that subsequent beverage containers of a row will be adjacent to the respective directly leading beverage container of the same row.

Thereby, the respective actual position of the beverage containers can be predicted with increased precision, as due to the deceleration by means of the stop there is no gap between the leading and trailing beverage containers of a row, or because due to the deceleration by means of the stop, a gap between the leading and trailing beverage containers can be closed.

In various embodiments, there may be several such stops respectively moving at the same speed in the conveying direction of the beverage containers and respectively decelerating the continuous conveying movement of a number of beverage containers. Herein, the number of beverage containers can at least be the number of beverage containers which can be accepted by a lowering motion of the one or more gripping heads.

In addition, at least two successively traveling gripping heads may be provided which during the travelling movement thereof immediately before adaptation thereof are moved in speed synchronism with the beverage containers, wherein an adaptation of the travelling movements thereof is made by a respective corrective offset in or against the conveying direction of the beverage containers with directly following resumption of the speed-synchronous travelling movement. E.g., for the corrective offset the respective gripping head can be briefly decelerated or accelerated with respect to the transport speed of the horizontal conveyor.

In particular, for dimensionally instable beverage containers it appeared that the expected nominal position of beverage containers increasingly deviates from a real actual position in the opposite direction of the conveying movement thereof. In order to be able to align several gripping heads arranged consecutively in the conveying direction with the pick-up positions thereof as precisely as possible to the beverage containers, embodiments have proven useful in which a first corrective offset of a first head leading in the conveying direction of the at least two gripping heads is done by a first amount, and a second corrective offset of a second head trailing in the conveying direction of the at least two gripping heads is done by a second amount. Herein, the second amount can be made to be larger with respect to the first amount. Both gripping heads can perform the respective corrective offset thereof simultaneously and depending on the respective determined actual position of the beverage containers. The respective amount of the corrective offset can be specified by a control unit to which the respective actual position is transmitted, and which is placed into operative connection with the at least two gripping heads. If at least one first gripping head and at least one second gripping head exist, then the at least one first gripping head and the at least one second gripping head can be made to be movable in relation to each other, in parallel to the conveying direction of the beverage containers.

Thus, adapting a travelling movement of a first one of the at least two gripping heads can be taken into account when adapting a travelling movement of a second one of the at least two gripping heads. Adapting the travelling movements can be done so that the determined pick-up positions of a first one of the at least two gripping heads are continuously flush with determined pick-up positions of a second one of the at least two gripping heads in the conveying direction of the beverage containers.

Consequently, adapting a travelling movement of a first one of the at least two gripping heads when adapting a travelling movement of a second one of the at least two gripping heads can be done so that a relative position of the two gripping heads with respect to each other is changed when the travelling movement is adjusted so that the relative distance from the at least one first gripping head to the at least one second gripping head in the conveying direction will increase or decrease. Preferably, once the respective travelling movement has been adapted and in a subsequent further travelling movement, the relative distance from the at least one first gripping head to the relative distance of the at least one second gripping head is maintained in parallel to the conveying direction of the beverage containers.

In addition, the at least two gripping heads can synchronously perform a lowering motion for accepting the beverage containers from the horizontal conveyor and/or a lifting motion for removing the beverage containers from the horizontal conveyor. As just mentioned, the relative position of the gripping heads can be maintained unchanged while the respective beverage containers are accepted and/or removed after the travelling movement has been adapted.

In addition, it is conceivable for the actual position of the one or more continuously moved beverage containers to be acquired by one or more photoelectric sensors having a detection range oriented vertically to the conveying direction of the beverage containers. In order to be able to predict the real actual position of the beverage containers in the conveying direction with high precision, specific embodiments have proven successful having at least two photoelectric sensors with a detection range oriented vertically to the conveying direction of the beverage containers.

Herein, a first one of the at least two photoelectric sensors can be placed upstream of a second one of the at least two photoelectric sensors in the conveying direction of the beverage containers. If more than one photoelectric sensor is provided for implementing the inventive method then the respective actual positions determined by all of the photoelectric sensors of the beverage containers can be taken into account when adapting the travelling movement of the one or more gripping heads. E.g., it is possible for an actual position of beverage containers to be acquired by a first photoelectric sensor, in addition for an actual position of the beverage containers to be acquired simultaneously by a second photoelectric sensor, and a travelling movement of the one or more gripping heads to be adapted at least approximately in real time whilst considering both of the acquired actual positions.

In addition, it is possible for at least one of the gripping heads to have first pick-up positions for beverage containers of a first one of the parallel guided rows and second pick-up positions for beverage containers of a second one of the parallel guided rows. Herein, depending on the acquired actual position of beverage containers, the first pick-up positions can be adjusted in relation to the second pick-up positions in or against the conveying direction of the beverage containers. In practice, it appears that in particular for dimensionally instable containers the actual position of beverage containers of a first row with respect to beverage containers of a second row frequently deviates from the expected nominal position. Due to the adjustment of the pick-up positions of the respective rows, which is possible in the scope of various embodiments, accepting the beverage containers can take place with additional precision and further reduction of collision in the lowering motion.

If more than two parallel rows, e.g. three or four parallel rows, are provided which are moved by the horizontal conveyor then each of the rows may have associated pick-up positions which can be adjusted in relation to each other.

In addition, it is possible for at least two gripping heads to be provided with respectively first and second pick-up positions which can be adjusted with respect to each other in or against the conveying direction, wherein adjustment of the first and second pick-up positions of a first one of the at least two gripping heads is done whilst an adjustment of the first and second pick-up positions of a second one of the at least two gripping heads is taken into account.

If considering the respective acquired actual position an adjustment of the first pick-up positions of a first gripping head is provided, an adjustment of the first pick-up positions of the first gripping head can be associated with an at least approximately time-synchronous adjustment of the first pick-up positions of the second gripping head. The first pick-up positions of a gripping head trailing in the conveying direction can be adjusted to a larger extent than the first pick-up positions of a gripping head leading in the conveying direction.

Also, in further embodiments, the amount and the direction in which the first pick-up positions of the first gripping head are adjusted in case of adaptation in or against the conveying direction of the beverage containers, can be made to be identical to the amount and direction with which the first pick-up positions of the second gripping head are adjusted in case of adaptation in or against the conveying direction of the beverage containers.

If more than two gripping heads, e.g. three or four gripping heads, are provided then the adjustment of the respective first or second pick-up positions thereof in case of adaptation can also be done in time synchronism. Herein, the pick-up positions associated with the respective row can be flush with each other in the conveying direction of the beverage containers before, during, and after the adjustment.

The present invention also relates to a system for discharging beverage containers which can be continuously moved in parallel rows in an ordered and at least approximately closed mass flow by means of a horizontal conveyor.

First of all, it should be noted that various features which have already been described with reference to the inventive method may also be used in numerous embodiments of the inventive system. Also, various features which will be described hereafter for the inventive system can also be used in many embodiments of an inventive method.

The horizontal conveyor can be formed by an endless conveyor belt on which the respective beverage containers are standing while being guided in parallel rows. Herein, channel plates and/or side walls allow for several transport tracks to be formed in parallel for the respective beverage containers, with the channel plates and/or side walls guiding the respective beverage containers on the transport tracks extending in parallel to each other.

E.g., before being transported by the horizontal conveyor, the beverage containers can be moved in an unordered mass flow. Herein, it is conceivable for an device to be placed upstream of the horizontal conveyor and supplying the respective beverage containers to the parallel rows or directing and splitting up the respective beverage containers into the parallel rows.

The inventive system includes one or more gripping heads, at least one detection device for acquiring an actual position of the beverage containers in the conveying direction as well as a control unit which is brought into operative connection with the detection device and the one or more gripping heads so that the control unit allows for a travelling movement, oriented in parallel to the conveying direction of the beverage containers, of the one or more gripping heads to be adapted whilst taking into account the acquired actual position.

E.g., for the travelling movement, the speed of the one or more gripping heads can be made to be identical to the transport speed of the horizontal conveyor. In addition, when the travelling movement is adapted, it is conceivable for a deceleration of the one or more gripping heads to be specified by the control unit with respect to the transport speed of the horizontal conveyor and/or the speed of a travelling stop or for an acceleration of the one or more gripping heads to be specified with respect to the transport speed of the horizontal conveyor and/or the speed of a travelling stop. In addition, after deceleration or acceleration, the one or more gripping heads can be moved at a speed which in turn is identical to the transport speed of the horizontal conveyor or the speed of the travelling stop. By such deceleration or acceleration the pick-up positions of the one or more gripping heads can be aligned with the actual position of the beverage containers transported by means of the horizontal conveyor.

The one or more gripping heads can be connected to a linear guide arranged by the horizontal conveyor, by means of which the one or more gripping heads can be reciprocated at least locally along the horizontal conveying device.

According to the invention, the one or more gripping heads respectively have one or more pick-up positions made for accepting the beverage containers via a lowering motion of the one or more gripping heads with subsequent removal of the beverage containers from the horizontal conveyor chronologically after adaptation of the travelling movement. The one or more gripping heads of the inventive system may have their own gripping device associated for each of the pick-up positions thereof, by means of which the respective beverage containers can be held when they are accepted. E.g., the respective gripping devices can be made for holding the beverage containers in non-positive and/or positive engagement.

In addition, it can be envisaged for the gripping devices, which may possibly be associated with respectively one pick-up position, to be made for a rotary movement of the beverage containers once they have been accepted. For this purpose, the respective gripping devices can be connected to the control unit causing a rotary movement of the respective beverage containers before subsequent dropping thereof, e.g. in a packaging machine or into corresponding packaging units. If the beverage containers are already provided with an identifier, such as a label or the like, for example, when the beverage containers are accepted, rotary alignment of the beverage containers can be performed whilst taking into account a position of the respective identifier.

As the control unit is preferably brought into operative connection with the gripping devices, it may be possible for the control unit to specify for the respective beverage containers to be held above the respective gripping device and subsequently for the connection between the gripping device and the respective beverage container to be released.

The detection device is preferably formed by an optical acquisition system, such as a camera or the like, for example. In particular, the detection device can comprise at least one, but preferably several photoelectric sensors arranged along a conveyor line of the beverage containers, wherein the detection range of the at least one photoelectric sensor extends vertically to the conveying direction of the beverage containers. The control unit can be coupled with the one or more photoelectric sensors wirelessly or via a wire link.

In preferred embodiments, the system can include at least two photoelectric sensors which are staggered at different positions along the horizontal conveyor or different positions along a conveyor line of the beverage containers or different positions in the conveying direction of the beverage containers. Both of the at least two photoelectric sensors can be made for acquiring an actual position of beverage containers and communicate with the control unit. In addition, the control unit can perform an adaptation of the travelling movement of the one or more gripping heads whilst taking into account the actual positions acquired by the at least two photoelectric sensors.

In particular for dimensionally instable beverage containers, an actual position at a first location along the conveying direction of beverage containers may deviate by a first amount from an expected nominal position and at another location along the conveying direction by a second amount from an expected nominal position, wherein the first amount and the second amount are different. By means of appropriate algorithms stored in the control unit, when several photoelectric sensors are used with adequate acquisition of the nominal position, a more precise prediction of the position to be expected in the conveying direction of beverage containers can be made. In embodiments with at least two photoelectric sensors, beverage containers can be accepted more precisely with a reduced risk of collision.

In addition, the system can include at least two gripping heads travelling consecutively in the conveying direction, which during the travelling movement immediately before the respective adaptation thereof are movable in speed synchronism with the beverage containers. The control unit may specify adaptation of the travelling movements by a respective corrective offset in or against the conveying direction of the beverage containers with immediately subsequent resumption of the speed-synchronous travelling movement thereof. The corrective offset can be specified so as to have a reduced amount for a gripping head leading in the conveying direction vs. a gripping head trailing in the conveying direction.

Thus, the control unit can perform an adaptation of the travelling movement of a first one of the at least two gripping heads whilst taking into account an adaptation of the travelling movement of a second one of the at least two gripping heads. Herein, it is possible for the at least two gripping heads to increase or decrease the relative position thereof in case of adaptation of the travelling movement in the conveying direction of the beverage containers.

As mentioned above, for the adaptation of the travelling movement or as part of the respective corrective offset, a deceleration or acceleration of the one or more gripping heads can take place with respect to the transport speed of the horizontal conveyor or the speed of a travelling stop in or against the conveying direction of the beverage containers. In further embodiments, it is also conceivable herein that in case of adaptation of a travelling movement all of the gripping heads are accelerated or decelerated by the same amount in or against the conveying direction of the beverage containers or that the corrective offset in case of adaptation of the travelling movement is made to be identical for all of the gripping heads.

If several gripping heads are available, depending on the respective acquired actual position, it is thus possible for an adaptation of the travelling movements of all gripping heads to be performed. Preferably, the adaptation of the travelling movements is done in time synchronism for all of the gripping heads.

It is also conceivable that the one or more gripping heads for each parallel row of the continuously moved beverage containers respectively form at least one, but preferably several pick-up positions respectively, wherein first pick-up positions for the first row can be adjusted in or against the conveying direction of the beverage containers in relation to the second pick-up positions for the second row depending on the actual position of the beverage containers acquired via the detection device.

If the system comprises at least one first and at least one second gripping head, then the at least one first and the at least one second gripping head can make respectively first and second pick-up positions adjustable in relation to each other for the first and second rows. Herein, the control unit can specify adjustment of the first and second pick-up positions of the first gripping head depending on adjustment of the first and second pick-up positions of the second gripping head.

In the travelling movement, the at least one second gripping head may follow at least one first gripping head. The first pick-up positions of the first gripping head can be flush with the first pick-up positions of the second gripping head in the conveying direction of the beverage containers. The control unit can be made for adjusting the respective first or second pick-up positions in or against the conveying direction depending on the actual position of the beverage containers acquired by the detection device.

In addition, if adjustment of the first pick-up positions of one of the gripping heads is required, provision can be made for at least approximately time-synchronous adjustment of the first pick-up positions of the further gripping heads in or against the conveying direction to be performed by the same amount or a different amount specified by the control unit. Likewise, in case adjustment of the second pick-up positions of the gripping heads is required, at least approximately time-synchronous adjustment of the second pick-up positions of the further gripping heads in or against the conveying direction of the beverage containers can be performed by the same or a different amount specified by the control unit. For a person skilled in the art addressed, it is obvious that even with more than two parallel rows each of the one or more gripping heads can make several pick-up positions for each of the rows, wherein all of the pick-up positions of all of the gripping heads can be adjusted for the respective row at least approximately in time synchronism and by the same or a different amount specified by the control unit in or against the conveying direction of the beverage containers.

In addition, it is possible for the system to include a travelling, stop oriented transversely to the conveying direction of the beverage containers for deceleration of the beverage containers, said stop being brought into operative connection with the control unit so that the control unit taking into account the speed of the stop can perform adaptation of the travelling movement of the at least one gripping head.

In particularly preferred embodiments, several of such stops may be present which are respectively brought into surface contact with a beverage container of each of the parallel rows. If several stops are present, the stops may travel at the same speed along the conveying direction of the beverage containers. Preferably, the stop(s) can extend vertically to the conveying direction of the beverage containers transversely above the horizontal conveying direction and the parallel rows.

Hereafter, sample embodiments of the invention and the advantages thereof will be explained more in detail by means of the appended figures. The proportions of the individual elements with respect to each other in the figures do not always match real proportions as some shapes are represented schematically and other shapes are represented in enlarged view with respect to the other items for ease of illustration.

BRIEF DESCRIPTION OF THE DRAWINGS

FIG. 4 shows essential steps of an embodiment of an inventive method.

Figure 1:
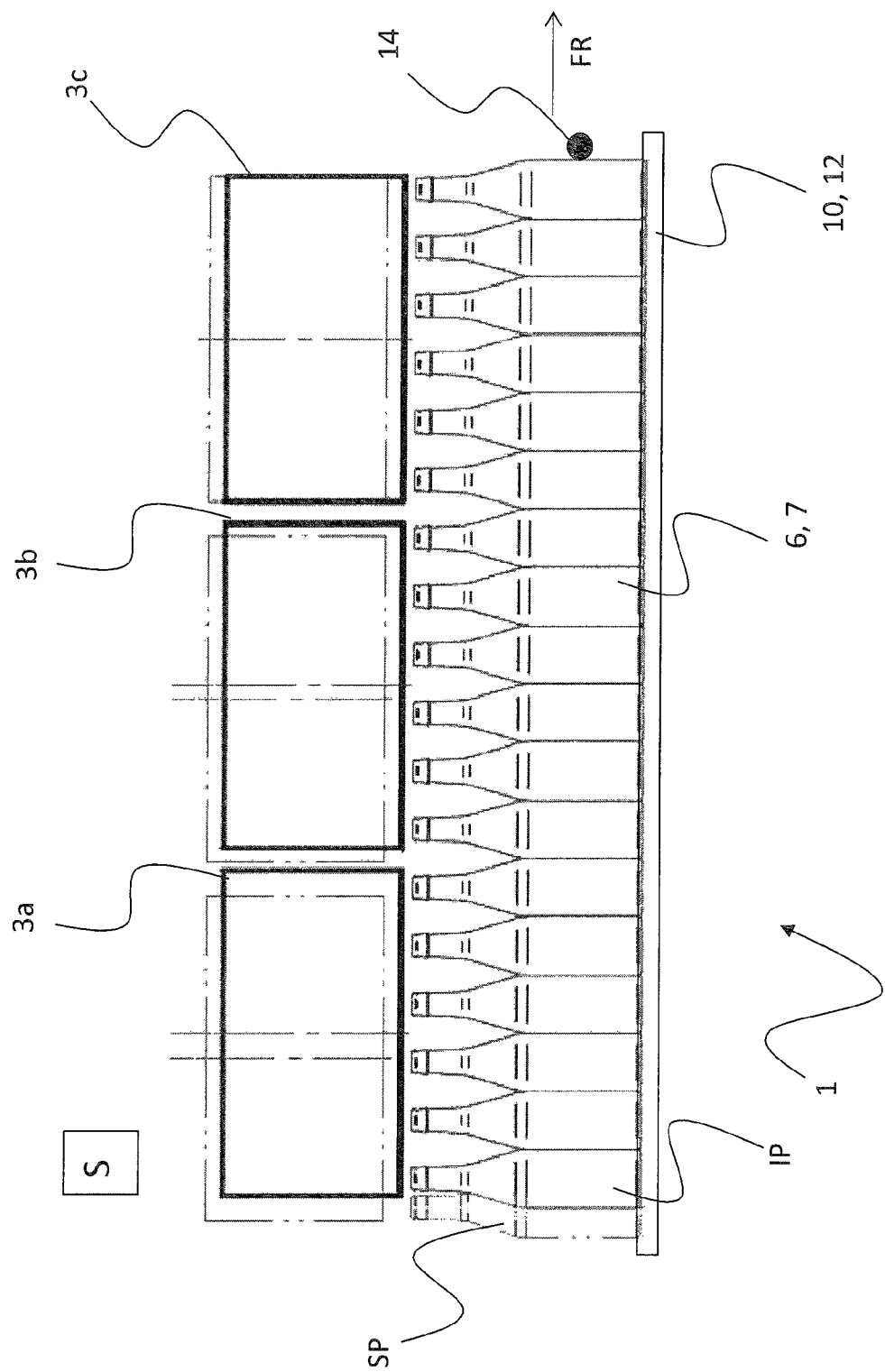
FIG. 1 shows a schematic side view of an embodiment of an inventive system.

For the same or equivalent elements of the invention, the same reference numerals are used. Furthermore, for the sake of clarity, in the individual figures only reference numerals are represented which are required for the description of the respective figure. The represented embodiments are merely examples of how the inventive system or inventive method can be configured and are not a conclusive limitation.

DETAILED DESCRIPTION OF THE ILLUSTRATIVE EMBODIMENT

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of the Illustrative Embodiment") relates to a requirement of the United States Patent Office, and should not be found to limit the subject matter disclosed herein.

FIG. 1 shows a schematic side view of an embodiment of an inventive system 1.

System 1 is provided for discharging beverage containers 6, here made of PET bottles 7, from a horizontal conveyor 10. The beverage containers 6 or PET bottles 7 are moved in a closed and ordered mass flow by the horizontal conveyor 10 or the endless conveyor belt 12. In the side view of FIG. 1, only one of the rows guided in parallel of beverage containers 6 is apparent, but several of such rows are guided in parallel to each other by means of the endless conveyor belt 12 and are separated by channel plates 15 also not apparent in FIG. 1 (see FIG. 3). By means of an arrow the conveying direction FR for the beverage container 6 is indicated extending in parallel for all of the rows.

The endless conveyor belt 12 is driven continuously and without interruption, wherein the beverage containers 6 are moved continuously at a constant transport speed by the endless conveyor belt 12.

In the sample embodiment of FIG. 1, the system 1 includes three gripping heads 3a to 3c which are arranged one after the other in the conveying direction FR of the beverage containers 6 or PET bottles 7. The number of the gripping heads 3a to 3c represented in FIG. 1 is only by way of example so that in various other embodiments there can be more than three gripping heads 3a to 3c or also fewer than three gripping heads 3a to 3c.

In addition, two detection devices 17 arranged consecutively in the conveying direction FR are provided which are formed by photoelectric sensors 19. In the schematic view of FIG. 1 the detection devices 17 or the photoelectric sensors 19 are not represented, but the detection devices 17 or the photoelectric sensors 19 can be seen with the possible arrangement thereof along the horizontal conveyor 12 by way of example in the sample embodiment of FIG. 3.

As part of a travelling movement, the gripping heads 3a, 3b, and 3c move in parallel to the conveying direction FR of the beverage containers 6 and along a longitudinal extension of the horizontal conveyor 10 or the endless conveyor belt 12. For this purpose, the gripping heads 3a to 3c are connected with a linear guide arranged above the beverage containers 6. To begin with, before adaptation of the travelling movement and before the beverage containers 6 are accepted, the speed of the gripping heads 3a to 3c is in speed synchronism with the movement of the travelling stop 14 with which a respectively foremost beverage container 6 of each row is in contact. With respect to the transport speed of the horizontal conveyor 10, the speed of the stop 14 is decreased. Likewise, stop 14 moves in the conveying direction FR of the beverage containers 6 or PET bottles 7.

Figure 2:
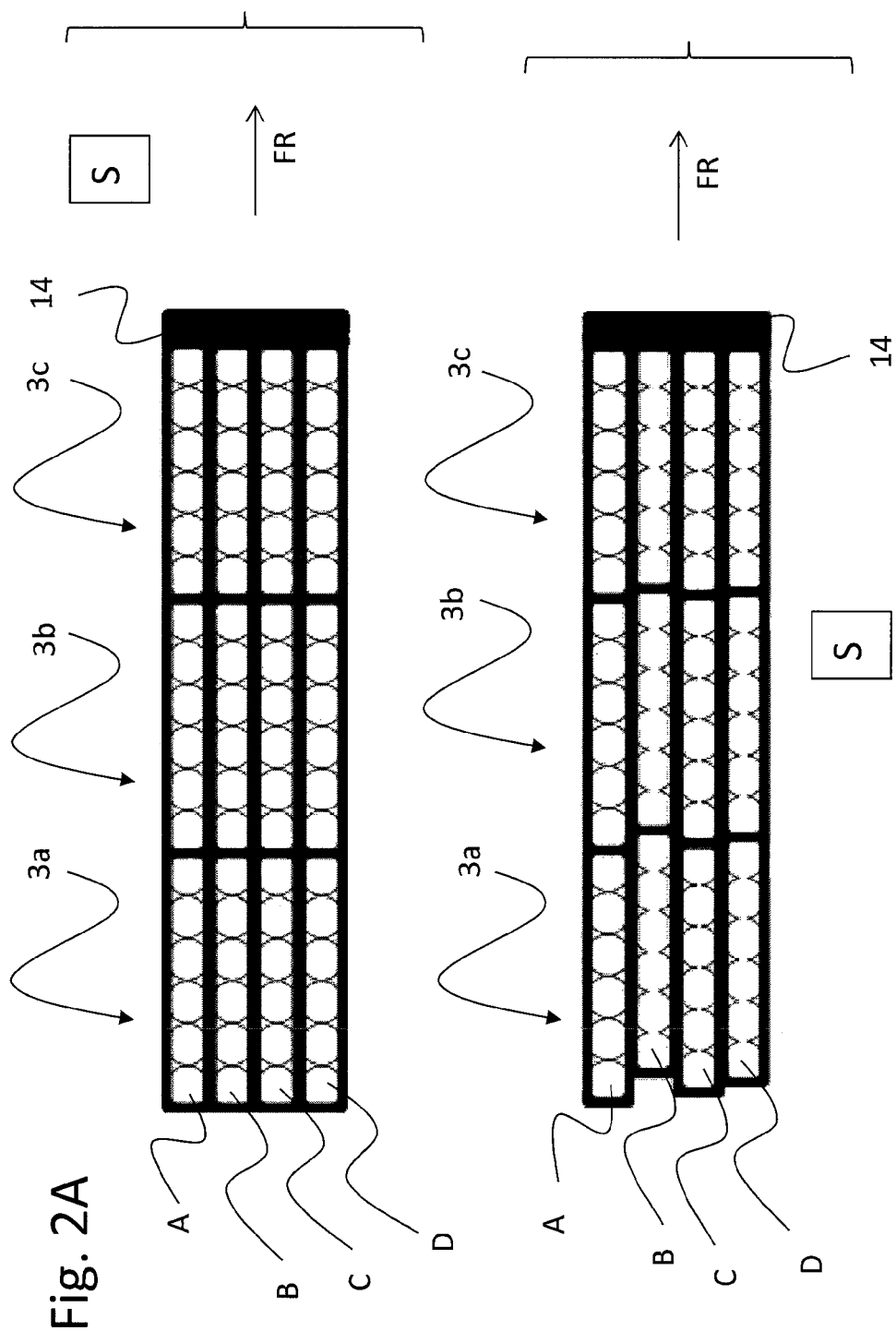
FIGS. 2A and 2B show a schematic top view of an embodiment of an inventive system illustrating the adaptation of a travelling movement of several gripping heads.

For each row of the beverage containers 6 transported in parallel, each of the gripping heads 3a to 3c has several pick-up positions A, B, C, and D as represented in FIG. 2 and described more in detail hereafter.

In addition, a control unit S is represented schematically, which is brought into operative connection with the gripping heads 3a to 3c and the detection device 17 or the photoelectric sensors 19. In the control unit S, indications regarding the respective nominal position SP of the beverage containers 6 are stored or saved, which they may adopt over the course of time when they are transported by means of the horizontal conveyor 12. Control unit S is also aware of the speed of the stop 14 where the foremost beverage containers 6 of a row are standing.

Depending on the nominal positions SP over the course of time, the gripping heads 3a to 3b are guided in the conveying direction FR along the horizontal conveyor 12, and first of all, in the travelling movement, they have a speed which is identical to the speed of the stop 14. Consequently, the gripping heads 3a to 3b are moved at least approximately in speed synchronism with the beverage containers 6.

As the beverage containers 6 are made in the form of PET containers 7 which tend to be dimensionally instable, it could be that due to dimensional instability and pressurized surface contact of the beverage containers 6 standing against each other, deformation of one or more of the beverage containers 6 may result. Due to deformation, the real actual position IP of one or more of the beverage containers 6 may deviate from an expected nominal position SP. In FIG. 1, it is clearly visible that the actual position IP of the beverage containers 6 in the conveying direction FR is ahead of the nominal position SP.

As just mentioned, the beverage container 6 arranged foremost of each of the parallel rows is adjacent to a stop 14, said stop 14 having a decreased speed with respect to the transport speed of the horizontal conveyor 10 or the endless conveyor belt 12, decelerating transport of the beverage containers 6. Stop 14 is oriented vertically to the conveying direction FR of the beverage containers 6 or PET bottles 7. Due to the deceleration via stop 14, on the one hand, gaps in the conveying direction FR are closed which may possibly be formed between consecutive beverage containers 6. In addition, deceleration will lead to increased pressurized surface contact of the beverage containers 6 resulting in deformation of the beverage containers 6 with already described deviation of the real actual position from an expected nominal position.

As based on experience, in practice several of such deformations occur in a plurality of beverage containers 6 in the conveying direction FR the real actual position of the beverage containers 6 will increasingly deviate from an expected nominal position with the distance from stop 14.

In order to be able to accept the beverage containers 6 during the continuous and uninterrupted movement by the horizontal conveyor 10 or endless conveyor belt 12 previous alignment or previous adaptation of the travelling movement of the gripping heads 3a to 3c is required.

Herein, the detection device 17 or the photoelectric sensors 19 transmit the real actual position IP of the beverage containers 6 in the conveying direction FR to the control unit S. The control unit S is then capable by means of the information on the real actual position IP of the beverage containers 6 to adapt the travelling movement of the gripping heads 3a to 3c to the real actual position of the beverage containers 6 in real time, so that after adaptation the beverage containers 6 can be accepted by the gripping heads 3a to 3c without collision and with high precision. As the actual position IP is ahead of the nominal position for adaptation of the respective travelling movement of the gripping heads 3a to 3c a corrective offset is required in the conveying direction.

Herein, the travelling movements of all of the gripping heads 3a to 3c are adapted simultaneously. The travelling movement made to be identical to the speed of stop 14 before adaptation is then briefly accelerated or decelerated so that the relative position of the gripping heads 3a to 3c to the beverage containers 6 is modified by means of the acceleration or deceleration, and after adaptation of the travelling movement or after brief acceleration or deceleration the gripping heads 3a to 3c have a changed relative position with respect to the beverage containers 6.

Herein, the relative position is to be made so that the pick-up positions A, B, and C of the gripping heads 3a to 3c after adaptation of the travelling movement or after brief deceleration or acceleration for accepting the beverage containers 6 are aligned with the beverage containers 6. As already mentioned before, the real actual position of the beverage containers 6 will increasingly deviate from an expected nominal position with the distance from stop 14. Consequently, a corrective offset in or against the conveying direction FR of the beverage containers 6 will have a lower amount for the leading gripping head 3c than a corrective offset of the trailing gripping head 3b in the conveying direction FR. In addition, a corrective offset in or against the conveying direction FR of the beverage containers 6 for the gripping head 3b will have a smaller amount than a corrective offset of gripping head 3a following gripping head 3b in the conveying direction.

Immediately after adaptation of the respective travelling movements, during further travelling movement, the gripping heads 3a to 3c can be moved again in speed synchronism with stop 14 or the beverage containers 6, so that the relative position between the gripping heads 3a to 3c and the respective beverage containers 6 or PET bottles 7 is maintained and the gripping heads 3a to 3c can accept the beverage containers 6 in the respective pick-up positions A, B and C thereof without collision.

For this purpose, the gripping heads 3a to 3c are lowered simultaneously in the direction of the horizontal conveyor 12 and moved during further travelling movement with the beverage containers 6 while the relative position thereof to the beverage containers 6 is maintained.

Each pick-up position A, B, and C of the gripping heads 3a to 3c has its own associated gripping device or tulip-shaped gripping device, which for the sake of clarity has not been represented in FIG. 1. Likewise, the gripping devices are connected to control unit S. In order to accept the beverage containers 6 or PET bottles 7 from the horizontal conveyor 10 the gripping devices can temporarily secure the respective beverage containers 6 to the respective gripping head 3a to 3c. A time of securing can be specified by the control unit S.

Once the temporary securing of the beverage containers 6 or PET bottles 7 to the respective gripping head 3a to 3c has been performed, the gripping heads 3a to 3c are lifted simultaneously in the direction away from the horizontal conveyor 10 or endless conveyor belt 12. Herein, the speed of the gripping heads 3a to 3c is still identical to the speed of stop 14.

In particularly preferred embodiments, the gripping devices connected to the control unit S can rotate or rotatingly move the respective accepted beverage containers 6 so that possibly an identification, such as a label for example, of the beverage containers 6 can be aligned while being discharging from the horizontal conveyor 10 or endless conveyor belt 12.

In practice, by means of the horizontal conveyor 10 or the endless conveyor belt 12 a plurality of different beverage containers 6 can be transported which differ in type of material and material thickness. Consequently, changing beverage containers 6 to be transported by the horizontal conveyor 10 and then to be discharged can first be accompanied by a large deviation of the expected nominal position SP from the real actual position IP. In order to overcome this problem, the system 1 can be formed by a teachable system in which indications regarding the respective beverage containers 6 to be transported by the horizontal conveyor 10 are transmitted to the control unit S. If the control unit S determines a deviation, in particular a frequently repeating deviation of the nominal position to be expected from the real actual position IP of beverage containers 6 then it can store the real actual positions IP and adapt the respective nominal positions to be expected to the acquired real actual positions during current operation. If the respective beverage containers 6 are to be transported again by means of the horizontal conveyor 10 and are to be discharged from the horizontal conveyor 10 at a later time, the control unit S can make use of the stored actual positions or earlier empirical values.

Herein, after prolonged operation of the system 1, the control unit S can predict the real actual position IP of the beverage containers 6 with increased precision so that adaptation of a travelling movement of the gripping heads 3a to 3c is no longer required after some operation of the system 1 or only with a lower corrective offset.

A schematic top view of an embodiment of an inventive system 1 illustrating the adaptation of a travelling movement of several gripping heads 3a to 3c is now shown in FIG. 2.

Thus in FIG. 2A, the three gripping heads 3a to 3c moving as part of the travelling movement thereof in the conveying direction FR of the beverage containers 6 can still be seen, as well as stop 14 which is also guided in the conveying direction FR. In FIG. 2A, the respective travelling movement of the gripping heads 3a to 3c has not yet been adapted to the respective acquired actual position IP of the beverage containers 6.

In addition, for each of the gripping heads 3a to 3c, FIG. 2A shows several pick-up positions A, B, C, and D. The first pick-up positions A of the gripping heads 3a, 3b, and 3c which are flush with the first pick-up positions A in the conveying direction FR of the beverage containers 6 are provided for accepting the beverage containers 6 of a first one of the parallel rows (cf. FIG. 3). In addition, the second pick-up positions B are provided for accepting beverage containers 6 of a second one of the parallel rows, the third pick-up positions C are provided for accepting beverage containers 6 of a third row, and the fourth pick-up positions D are provided for accepting beverage containers 6 of a fourth row. Thus, for each of the parallel rows, each of the gripping heads 3a to 3c respectively has several pick-up positions A, B, C, or D. Herein, the pick-up positions A, B, C, and D are respectively made by a gripping device for respectively one beverage container 6.

In the sample embodiment of FIG. 2A, the pick-up positions A, B, C, and D are specified at least approximately as fixed at the respective gripping head 3a to 3c. A relative movement of the first pick-up positions A with respect to each other, as well as a relative movement of the first, second, third and/or fourth pick-up positions A, B, C, and D with respect to each other, are not possible in FIG. 2A.

In addition, the total number of a first, second, third, and fourth pick-up position A, B, C, and D of the first gripping head 3a, the second gripping head 3b, and the third gripping head 3c respectively corresponds to a number of beverage containers 6 provided for a packaging unit. By accepting and subsequently dropping beverage containers 6 from the horizontal conveyor 10 (cf. FIG. 1), a packaging unit can thus be completely filled with beverage containers 6 by a gripping head 3a, 3b, or 3c.

In the embodiment shown in FIG. 2B, the actual position IP of the beverage containers 6 has already been acquired and the travelling movement of the gripping heads 3a to 3c has been adapted to the acquired actual position IP. Herein, according to the sample embodiment of FIG. 2B, the first, second, third, and fourth pick-up positions A, B, C, and D of the gripping heads 3a to 3c were respectively adjusted in relation to each other. For the relative adjustment of the first, second, third, and fourth pick-up positions A, B, C, and D, additionally or alternatively, a corrective offset of the gripping heads 3a to 3c, as already described with reference to the sample embodiment of FIG. 1, can take place depending on the respectively acquired actual position IP.

In FIG. 2B, the adjustment of the first pick-up positions A of the gripping heads 3a to 3C, the second pick-up positions B of the gripping heads 3a to 3c, the third pick-up positions C of the gripping heads 3a to 3c, as well as the fourth pick-up positions D of the gripping heads 3a to 3C respectively take place in time synchronism and at least approximately in real time when the respective actual position has been detected by the detection device 17.

As already mentioned above, due to dimensional instability of the beverage containers 6, deviation of the real actual position IP of the beverage containers 6 from an expected nominal position SP grows with increasing distance from stop 14. Consequently, the pick-up positions A, B, C, and D of the gripping head 3a with the largest distance from the stop 14 were adjusted by a larger amount than the pick-up positions A, B, C, and D of the gripping head 3b ahead of gripping head 3a. In addition, the pick-up positions A, B, C, and D of the gripping head 3c ahead of gripping head 3b was adjusted by a smaller amount than the pick-up positions A, B, C, and D of the gripping head 3b. The adjustment of all of the pick-up positions A, B, C, and D can take place respectively in or against the conveying direction FR of the beverage containers 6 or PET bottles 7.

Figure 3:
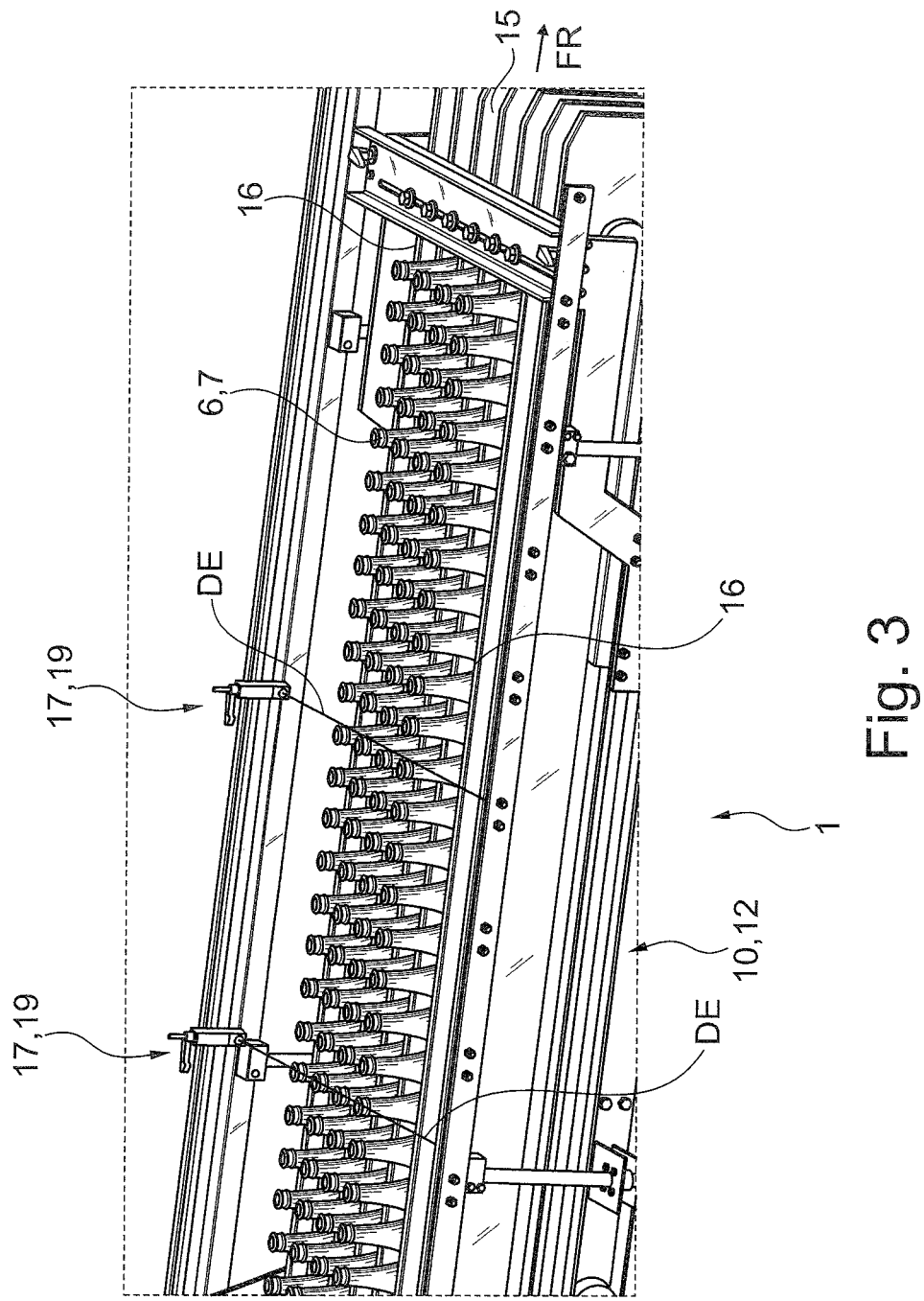
FIG. 3 shows a schematic perspective view of an embodiment of an inventive system.

In addition in FIG. 3, the beverage containers 6 or PET bottles 7 can be seen as being guided in parallel rows and in the conveying direction FR. The gripping heads 3a to 3c of the previous FIGS. 1 and 2 are not represented for the sake of clarity.

FIG. 3 shows several channel plates 15 associated with the horizontal conveyor 10 or endless conveyor belt 12 guiding the beverage containers 6 or PET bottles 7 in parallel rows. Herein, the channel plates 15 are oriented in parallel to each other. In addition, second side walls 16 are represented which laterally limit the beverage containers 6 being guided along the horizontal conveyor 10 and in the conveying direction FR. As can be seen in FIG. 3, the vertical extension of the channel plates 15 and the side walls 16 does not exceed the neck of the beverage containers 6 formed by PET bottles 7 so that the PET bottles 7 are held from above to be accessible for the gripping heads 3a to 3c.

In addition, the detection devices 17 are represented to which reference has already been made previously. In the sample embodiment of FIG. 3, two detection devices 17 are provided, which are arranged consecutively in the conveying direction FR of the beverage containers 6 in the area of the horizontal conveyor 10. The detection devices 17 are respectively formed by a photoelectric sensor 19 and respectively have a detection range DE extending vertically to the conveying direction FR of the beverage containers 6.

FIG. 4 shows essential steps of an embodiment of an inventive method 2.

Thus, in a first step, an actual position IP of one or more continuously moved beverage containers 6 is acquired. In addition, in a consecutive step, adaptation of a travelling movement of several gripping heads 3a to 3c, oriented in parallel to the conveying direction FR of the beverage containers 6, is performed whilst taking into account the acquired actual position IP. Once the travelling movement has been adapted, a lowering motion of the gripping heads 3a to 3c is performed with further travelling movement and for accepting the beverage containers 6 by respectively one pick-up position A, B, C, or D.

Finally, the beverage containers 6 are removed from the horizontal conveyor 10 by means of a lifting motion of the gripping heads 3a to 3c.

The invention was described with reference to a preferred embodiment. However, the person skilled in the art will understand that modifications or changes can be made to the invention without departing from the scope of the appended claims.

REFERENCE LIST 1 system
2 method
3 gripping heads
6 beverage containers
7 PET bottles
10 horizontal conveyor
12 endless conveyor belt
14 stop
15 channel plates
16 side wall
17 detection device
19 photoelectric sensor
A first pick-up positions
B second pick-up positions
C third pick-up positions
D fourth pick-up positions
DE detection area
IP actual position
S control unit
SP nominal position

The invention claimed is:

1. A method (2) for discharging beverage containers (6) continuously moved on a horizontal conveyor (10) and guided in parallel rows, by one or more gripping heads (3a, 3b, 3c), said one or more gripping heads (3a, 3b, 3c) respectively forming at least one pick-up position (A, B, C, D) for the beverage containers (6) to be discharged and said beverage containers (6) being guided on the horizontal conveyor (10) at least approximately together, the method (2) comprising the following steps:
continuously moving one or more beverage containers in a conveying direction (FR);
acquiring an actual position (IP) adopted in the conveying direction (FR) by one or more of the continuously moved beverage containers (6);
adapting of a travelling movement, oriented in parallel to the conveying direction (FR) of the beverage containers (6), of the one or more gripping heads (3a, 3b, 3c) whilst taking into account the acquired actual position (IP);
performing a lowering motion of the one or more gripping heads (3a, 3b, 3c) during further travelling movement for accepting respectively one beverage container (6) by respectively one of its at least one pick-up positions (A, B, C, D); and
removing the beverage containers (6) from the horizontal conveyor (10) by means of a lifting motion of the respective one or more gripping heads (3a, 3b, 3c).

2. The method (2) according to claim 1, wherein for each row of the continuously guided beverage containers (6), the one or more gripping heads (3a, 3b, 3c) respectively have at least one, but preferably more than one pick-up position (A, B, C, D).

3. The method (2) according to claim 2, wherein during the further travelling movement and during the removal of the beverage containers (6) by means of the lifting motion thereof, the one or more gripping heads (3a, 3b, 3c) are continuously moved in speed synchronism with the beverage containers (6) and in parallel to the conveying direction (FR) thereof.

4. The method (2) according to claim 1, wherein the continuous movement of the beverage containers (6) is decelerated by at least one travelling stop (14) oriented transversely to the conveying direction (FR), and a speed of the stop (14) is taken into account when adapting the travelling movement of the one or more gripping heads (3a, 3b, 3c).

5. The method (2) according to claim 1, comprising at least two gripping heads (3a, 3b, 3c) travelling consecutively in the conveying direction (FR), which are moved, during the travelling movement thereof, immediately before said travelling movement being respectively adapted, in speed synchronism with the beverage containers (6), wherein adaptation of the travelling movements thereof is done by a respective corrective offset in or against the conveying direction (FR) of the beverage containers (6) with immediately subsequent resumption of the speed-synchronous travelling movement, wherein the respective corrective offset is determined based on a difference between an expected nominal position of a beverage container and the acquired actual position of the beverage container.

6. The method (2) according to claim 5, wherein a first corrective offset of a first of the at least two gripping heads (3a, 3b, 3c) leading in the conveying direction (FR) is performed by a first amount and a second corrective offset of a second of the at least two gripping heads (3a, 3b, 3c) trailing in the conveying direction (FR) is performed by a second amount, wherein the second amount is configured larger than the first amount.

7. The method (2) according to claim 1, wherein at least two gripping heads (3a, 3b, 3c) synchronously perform a lowering motion for accepting the beverage containers (6) from the horizontal conveyor (10) and/or removal of the beverage containers (6) from the horizontal conveyor (10).

8. The method (2) according to claim 1, wherein the actual position (IP) of the one or more continuously moved beverage containers (6) is acquired by one or more photoelectric sensors (19) with a detection area (DE) oriented vertically to the conveying direction of the beverage containers.

9. The method (2) according to claim 1, wherein at least one of the gripping heads (3a, 3b, 3c) has first pick-up positions (A) for beverage containers (6) of a first one of the rows guided in parallel and second pick-up positions (B) for beverage containers of a second one of the rows guided in parallel, wherein depending on the acquired actual position (IP) of the beverage containers (6) the first pick-up positions (A) are adjusted in relation to the second pick-up positions (B) in or against the conveying direction (FR) of the beverage containers (6).

10. The method (2) according to claim 9, wherein at least two gripping heads (3a, 3b, 3c) are present with first and second pick-up positions (A, B) respectively adjustable in relation to each other in or against the conveying direction (FR), wherein a control unit (S) specifies an adjustment of the first and second pick-up positions (A, B) of a first one of the at least two gripping heads (3a, 3b, 3c) is performed taking into account an adjustment of the first and second pick-up positions (A, B) of a second one of the at least two gripping heads (3a, 3b, 3c).

11. A system (1) for discharging beverage containers (6), which can be moved continuously in parallel rows in an ordered and at least approximately closed mass flow, comprising
    a horizontal conveyor (10) configured to convey the beverage containers (6) in a conveying direction (FR),
    one or more gripping heads (3a, 3b, 3c),
    at least one detection device (17) for acquiring an actual position (IP) of the beverage containers (6) in the conveying direction, and
    a control unit (S) which is brought into operative connection with the at least one detection device (17) and the one or more gripping heads (3a, 3b, 3c) such that the control unit (S) can adjust a travelling movement, oriented in parallel to the conveying direction (FR) of the beverage containers (6), of the one or more gripping heads (3a, 3b, 3c) whilst taking into account the acquired actual position (LP),
    wherein the one or more gripping heads (3a, 3b, 3c) respectively have one or more pick-up positions (A, B, C, D) which are configured for accepting the beverage containers (6) via a lowering motion of the one or more gripping heads (3a, 3b, 3c) with subsequent removal of the beverage containers (6) from the horizontal conveyor (10) chronologically after adaptation of the travelling movement.

12. The system (1) according to claim 11, wherein the detection device (17) comprises at least one, but preferably several photoelectric sensors (19) arranged along a conveyor line of the beverage containers (6), wherein the detection range (DE) of the at least one photoelectric sensor (19) extends vertically to the conveying direction (FR) of the beverage containers (6).

13. The system according to claim 11, comprising at least two gripping heads (3a, 3b, 3c) able to consecutively travel in the conveying direction (FR), which, during the travelling movement thereof, immediately before the respective adaptation thereof, are movable in speed synchronism with the beverage containers (6), wherein the control unit (S) can specify an adaptation of the travelling movements thereof by a respective corrective offset in or against the conveying direction (FR) of the beverage containers (6) with immediately subsequent resumption of the speed-synchronous travelling movement thereof.

14. The system (1) according to claim 11, wherein the one or more gripping heads (3a, 3b, 3c), for each parallel row of the continuously moved beverage containers (6), respectively have at least one, but preferably several pick-up positions (A, B, C, D) respectively, wherein first pick-up positions (A) for the first row in or against the conveying direction (FR) of the beverage containers (6) are adjustable in relation to second pick-up positions (B) for the second row depending on the actual position (IP) of beverage containers (6) acquired by the detection device (17).

15. The system (1) according to claim 11, wherein at least one first gripping head (3a) forms first and second pick-up positions (A, B) adjustable in relation to each other for the first and second rows, and likewise at least one second gripping head (3b) forms first and second pick-up positions (A, B) adjustable in relation to each other for the first and second rows, wherein the control unit (S) can specify an adjustment of the first and second pick-up positions (A, B) of the first gripping head (3a) depending on an adjustment of the first and second pick-up positions (A, B) of the second gripping head (3b).

16. The system (1) according to claim 11, comprising a travelling stop (14) oriented transversely to the conveying direction of the beverage containers for deceleration of the beverage containers (6), said stop (14) being brought into operative connection with the control unit (S) so that the control unit (S) can perform an adaptation of the travelling movement of the at least one gripping head (3a, 3b, 3c) whilst taking into account a speed of the stop (14).

* * * * *